Patented Oct. 4, 1949

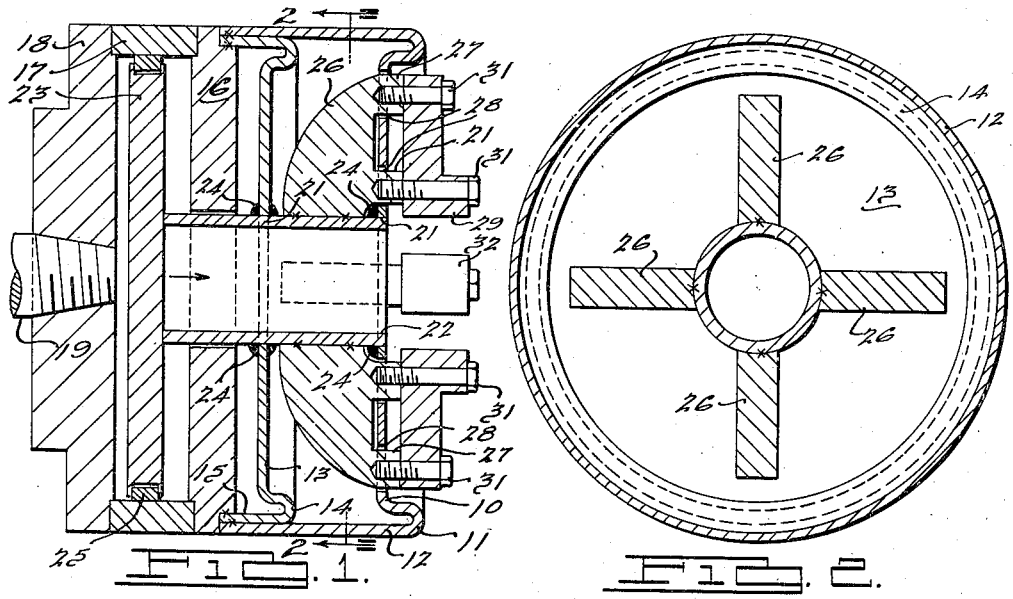
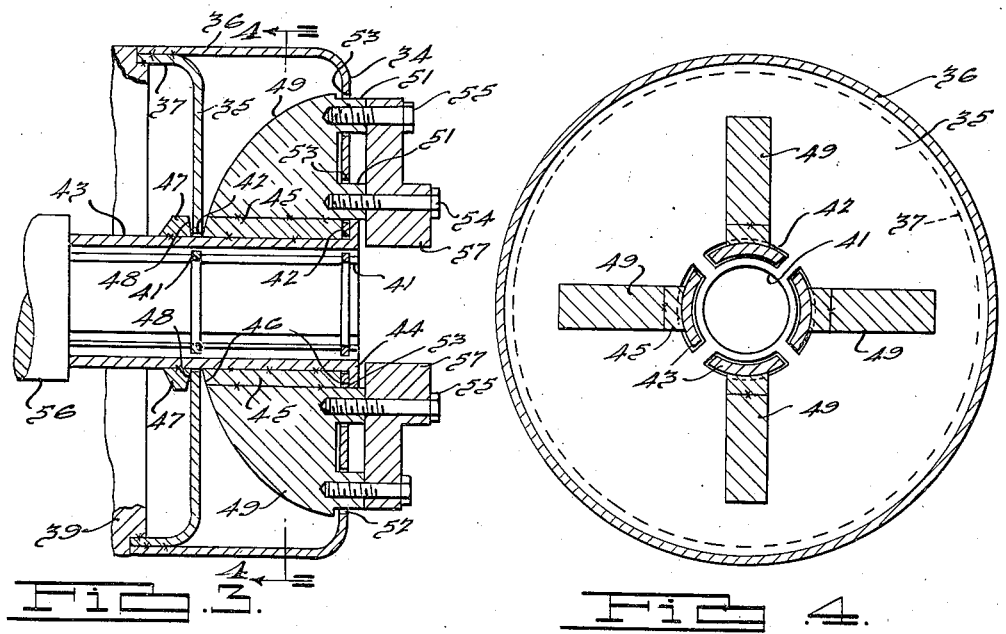
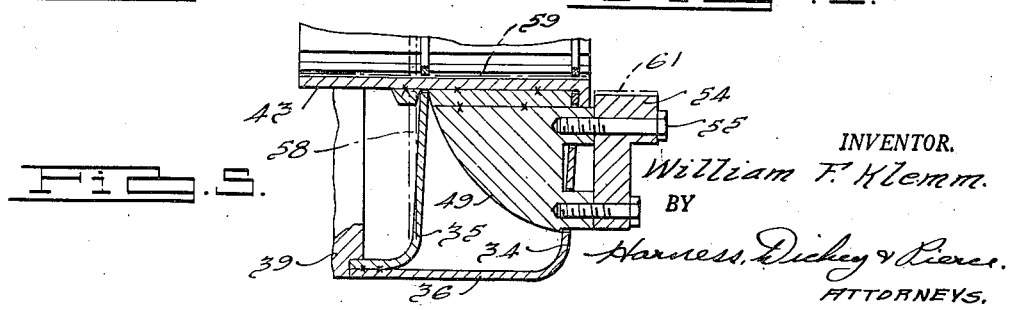

2,483,496

UNITED STATES PATENT OFFICE 2,483,496

PRECISION CHUCK

William F. Klemm, Detroit, Mich.

Application September 3, 1946, Serial No. 694,652

9 Claims. (Cl. 279—46)

This invention relates to precision chucks and particularly to a diaphragm type of chuck having jaws which move to open and closed positions while being maintained parallel to each other.

Precision chucks have been made heretofore employing a single diaphragm which was expanded and contracted to open and close the jaws supported thereby. In expanding the diaphragm to open the jaws, the diaphragm assumed a slightly conical shape which tilted the jaws out of planes parallel to each other. This resulted in a slight cocking of the workpiece in the jaws when the diaphragm was contracted to move the jaws into holding position, and assurance was never had that the workpieces were maintained in exactly the same position.

The present invention pertains to a precision type of chuck which is so constructed that the expansion of a pair of diaphragm moves the jaws away from each other while maintaining them parallel in all positions. The cocking of the jaws is thereby eliminated and assurance is had that all of the workpieces are clamped in exactly the same manner and position. The diaphragms are spaced apart and joined together at the outer edges and at the edges of inner apertures. Pressure applying means deflects the diaphragms into slightly conical shape, while the central and side joining portions are retained parallel with the central portion in all of its expanded positions. The jaws are mounted on the central portion so that they will move outwardly of each other. Since the central portion is retained parallel to all its positions, the jaws in like manner will be retained parallel to all shifted positions and will not be tilted as occurs from the use of a single diaphragm.

Accordingly, the main objects of the invention are: to provide a chuck made up of parts to produce a parallelogram arrangement with the jaw supporting elements so that when two elements of the parallelogram are deflected, the jaw supporting elements will be retained parallel to all its positions; to form a precision chuck from a pair of diaphragms joined together in spaced relation at their outer edges and also at the marginal edge of an inner aperture, and with the jaws supported on the element joining the inner aperture of the diaphragms to have the jaws open and close while maintained parallel to all of their positions when the diaphragms are deflected; and, in general, to provide a precision chuck which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

Figure 1 is a sectional view of a precision type of chuck embodying features of this invention;

Fig. 2 is a sectional view of the chuck illustrated in Fig. 1, taken on the line 2—2 thereof;

Fig. 3 is a sectional view of a chuck, similar to that illustrated in Fig. 1, showing a modified form thereof;

Fig. 4 is a sectional view of the structure illustrated in Fig. 3, taken on the line 4—4 thereof, and Fig. 5 is a broken view of the structure illustrated in Fig. 1, when in jaw opening position.

Referring to Figs. 1 and 2, the precision chuck therein illustrated embodies an outer diaphragm 10 having a reversely bent rim portion 11 and a cylindrical outer wall 12. An inner diaphragm 13 also has a reversely bent rim portion 14 and an outer cylindrical wall portion 15 which telescopes within the cylindrical wall portion 12 of the diaphragm 10. The two wall portions are secured to each other and to a cylindrical plate 16 which forms the one head for a cylinder 17 to which is secured a second head 18 having a conduit 19 attached thereto.

Each of the diaphragms 10 and 13 has a central opening 21 through which a thin wall tube 22 extends into engagement with a piston 23 disposed within the cylinder 17. The tube 22 is secured to the diaphragms 10 and 13 in a suitable manner herein illustrated as by welding 24. The piston 23 is sealed to the wall of the cylinder 17 by a suitable sealing ring 25. When fluid is introduced through the conduit 19 into the cylinder 17, the pressure will build up on the piston 23 to advance it and the tube 22 to the right, as viewed in the figure. This advancement will cause the disks 10 and 13 to assume a slightly conical shape which will produce a radial tension on the tube 22 to cause it to expand, with the walls maintained in parallel relation to all of its positions. In other words, the deflection of the diaphragms 10 and 13 causes a uniform expansion of the tube to increase its diameter. To clearly understand this action, a section of one-half of the diaphragms and the connecting elements may be likened to a rectangle having all corners hinged together. When the parallel sides of greater length are disposed horizontally and those of shorter length are disposed vertically, the raising of one of the sides of shorter length will retain the side parallel to the fixed side but will cause it to move toward the fixed side and advance proportional to the angle at which the longer parallel sides are disposed to the horizontal.

The jaw supporting arms 26, herein illustrated as four in number, are mounted 90° apart on the tube 22, being welded or otherwise secured in fixed relation thereto. The arms have projecting fingers 27 which extend through slots 28 in the diaphragm 10 which are of greater length than the length of the fingers 27 to permit the movement of the fingers therein radially of the tube 22. Clamping jaws 29 are mounted on the fingers 27 by bolts 31, having faces 32 thereon which are located equidistant from the axis of the tube 22. When the tube 22 is moved to the right, as viewed in the figure, to deflect the diaphragms 10 and 13, it will be enlarged, having the walls thereof stretched to move outwardly, moving the arms 26 and therefore the jaws 29 outwardly therewith an equal amount in all directions from the central axis. This will move the faces 32 of the jaws a slight amount away from each other while being maintained parallel to each other and to all of their positions for releasing a workpiece and for being retained in separated position to permit a new workpiece to be inserted between the faces.

When the pressure is released from the piston 23, the tension in the diaphragms 10 and 13 will retract the tube 22 and the piston, permitting the jaws 29 to move inwardly toward each other to have the faces 32 thereof clamp and rigidly secure the workpiece with its axis aligned on the axis of the tube 22.

Referring to Figs. 3 and 4, a further form of the invention is illustrated, that wherein a pair of diaphragms 34 and 35 have walls 36 and 37, respectively, mounted in telescoped relation and welded to each other and to a head 39. The diaphragms 34 and 35 have central apertures 41 and a plurality of arcuate slots 42 inwardly of the peripheral edge of the aperture 41. Arcuate shaped plates 43 extend through the arcuate slots 42 in the diaphragms and have a flange 44 at the top which abuts against the top surface of the diaphragm 34. Spacers 45 are secured to the outer surface of the plates 43 by welding or other means to space the central portions of the diaphragms a predetermined distance from each other. The spacers 45 are arcuately formed at the ends 46 to permit the diaphragms to deflect. Bosses 47 are welded or otherwise secured to the outer surface of the plates 45 on the bottom side of the diaphragm 35 for clamping the diaphragm against the spacer plates 45. The surfaces 48 of the bosses 47 are arcuately formed to permit the diaphragm 35 to be deflected. It is to be understood that any number of the plates 43 may be mounted in this manner inwardly of the apertures 41 of the diaphragm, and herein four of such plates are illustrated.

Arms 49 are welded or otherwise secured to the spacer plates 45, having fingers 51 which project through elongated apertures 52 and 53 in the diaphragm 34. Work supporting jaws 54 are secured to the fingers 51 by suitable means, herein illustrated by screws 55. Suitable means are provided for moving the plates 43 on the axis of the apertures 41 in the diaphragm, such as the piston 23 in the structure illustrated in Fig. 1, or by a plunger 56 which engages the ends of the plates, as illustrated in Fig. 3.

When the jaws 54 are to be opened for the purpose of receiving a workpiece, the plunger 56 is moved to the right to move the plates 43 also to the right. The applied force is carried through the bosses 47 and the spacers 45 to the diaphragms 35 and 34, respectively, to cause them to deflect relative to the cylindrical wall portions 37 and 36, respectively. This deflection causes the plates 43 to move radially outward from the axis of the apertures 41 to thereby move the jaws 54 away from each other so that a workpiece may be placed between the jaw faces. When the plunger 56 is retracted, the tension in the diaphragms 34 and 35 moves the plates 43 therewith and radially inward until the jaws 54 engage the workpiece which is securely held in position thereby, due to the tension in the diaphragms. In view of the fact that the plates 43 move radially outwardly, the faces are maintained parallel to all of their positions so that the arms 49, and also the jaws 54, move radially without any tipping effect so that the workpiece must be accurately located without cocking when engaged by the faces of the jaws. The faces 57 of the jaws are preferably machined, ground or otherwise formed on a surface of the cylinder conforming to the cylindrical surface of the workpiece which is to be supported. The faces of the jaws 29 of Fig. 4 are illustrated as being flat so that these jaws may clamp a workpiece which is cylindrical or of other shape.

Referring to Fig. 5, the diaphragms 34 and 35 are illustrated as being moved out from normal position illustrated in dot and dash line at 58, with the plates 43 moved axially and radially outwardly from a position 59, which thereby moves the jaws in the same manner from a position 61. From this view it will be seen how the parallelogram arrangement produced by the cylindrical wall 36, the two diaphragms 34 and 35 and the plate 43 is formed. When the two diaphragms 34 and 35 are deflected in parallel relation from the cylindrical wall 36, the plates 43 will be maintained at all times parallel to the cylindrical wall 36 and no tilting effect will be produced either to the plates 43 or to the jaws 54.

What is claimed is:

1. A precision chuck having a pair of jaws, members assembled in parallelogram arrangement, and means supporting the jaws on elements of said members which are retained parallel to all of their positions when the parallelogram is distorted to thereby expand and contract the jaws while maintaining the jaws in parallel relation to each other in all positions.

2. A precision chuck comprising a pair of spaced diaphragms having a central passage, means joining the inner and outer edges of said diaphragms for retaining them in spaced relation to each other, means for deflecting the inner portion of said diaphragms relative to the outer portion while being maintained in parallel relation so as to have the joining means on the inner portion expanded radially while being maintained parallel in all positions to the outer joining means, and means for supporting jaws on said inner joining means to be moved therewith without tilting relative to each other.

3. In a precision chuck, a pair of spaced diaphragms having a central aperture, means joining the diaphragms at their outer edges, means joining the diaphragms at the inner apertures, jaws supported on said means joining the diaphragms at the inner apertures, and means for deflecting said diaphragms from the outer joining means to have the inner joining means expanded to separate said jaws while maintaining the jaws in parallel relation in all positions.

4. In a precision chuck, a pair of diaphragms having cylindrical peripheral walls which are secured in telescoping relation to each other and having central apertures, a cylinder extending through said apertures and secured to said diaphragms, means for deflecting said diaphragms by the axial movement of said cylinder to produce a radial expansion to the cylinder outwardly of its axis, with all portions of the cylinder maintained parallel to the axis in all positions.

5. In a precision chuck, a pair of diaphragms having cylindrical peripheral walls which are secured in telescoping relation to each other and having central apertures, a cylinder extending through said apertures and secured to said diaphragms, means for deflecting said diaphragms by the axial movement of said cylinder to produce a radial expansion to the cylinder outwardly of its axis, with all portions of the cylinder maintained parallel to the axis in all positions, and jaws secured to said cylinder independent of said diaphragms for expansion therewith.

6. In a precision chuck, a pair of diaphragms having cylindrical peripheral walls which are secured in telescoping relation to each other and having central apertures, a cylinder extending through said apertures and secured to said diaphragms, means for deflecting said diaphragms by the axial movement of said cylinder to produce a radial expansion to the cylinder outwardly of its axis, with all portions of the cylinder maintained parallel to the axis in all positions, arms positioned between said diaphragms and secured to said cylinder having fingers thereon extending through apertures in one of the diaphragms, and jaws secured to said fingers to be moved by said arm when said arm is moved by said cylinder to move said jaws away from each other while maintaining them in parallel relation to each other and to their various positions.

7. In a precision chuck, a pair of diaphragms, a cylindrical wall securing said diaphragms in spaced relation to each other at their outer periphery, spaced plates for spacing said diaphragms from each other at their central portion and secured to the diaphragms, and means for deflecting said diaphragms from said cylindrical wall at an angle thereto to move the plates radially toward said cylindrical wall without tilting.

8. In a precision chuck, a pair of diaphragms, a cylindrical wall securing said diaphragms in spaced relation to each other at their outer periphery, spaced plates for spacing said diaphragms from each other at their central portion and secured to the diaphragms, means for deflecting said diaphragms from said cylindrical wall at an angle thereto to move the plates radially toward said cylindrical wall without tilting, and jaws supported on said plates to be moved therewith radially outwardly without tilting.

9. In a precision chuck, a pair of diaphragms, a cylindrical wall securing said diaphragms in spaced relation to each other at their outer periphery, spaced plates for spacing said diaphragms from each other at their central portion secured to the diaphragms, means for deflecting said diaphragms from said cylindrical wall at an angle thereto to move the plates radially toward said cylindrical wall without tilting, one of said diaphragms having apertures therethrough, means secured to each plate between said diaphragms having fingers thereon extending through said apertures, and jaws having work engaging faces secured to said fingers to be moved radially outwardly with said plates when the diaphragm is deflected for moving said clamping faces radially while being maintained parallel to all of their positions.

WILLIAM F. KLEMM.

REFERENCES CITED

The following references are of record in the file of this patent:

UNITED STATES PATENTS

| Number | Name | Date |
|---|---|---|
| 1,866,374 | Smith | July 5, 1932 |
| 2,389,366 | Jones | Nov. 20, 1945 |
| 2,403,599 | Hohevart et al. | July 9, 1946 |

FOREIGN PATENTS

| Number | Country | Date |
|---|---|---|
| 548,690 | Great Britain | Oct. 20, 1942 |